Oct. 28, 1924.　　　　　　　　　　　　　　　　　　1,513,546
H. A. GERKEN
ILLUMINATION INDICATOR FOR LAMPS
Filed May 7, 1923
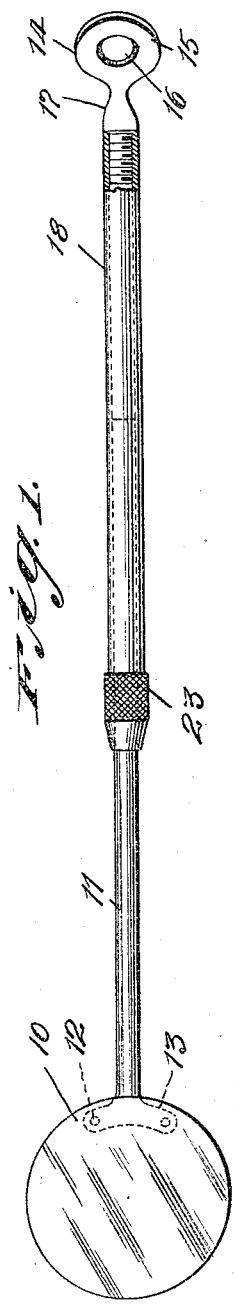
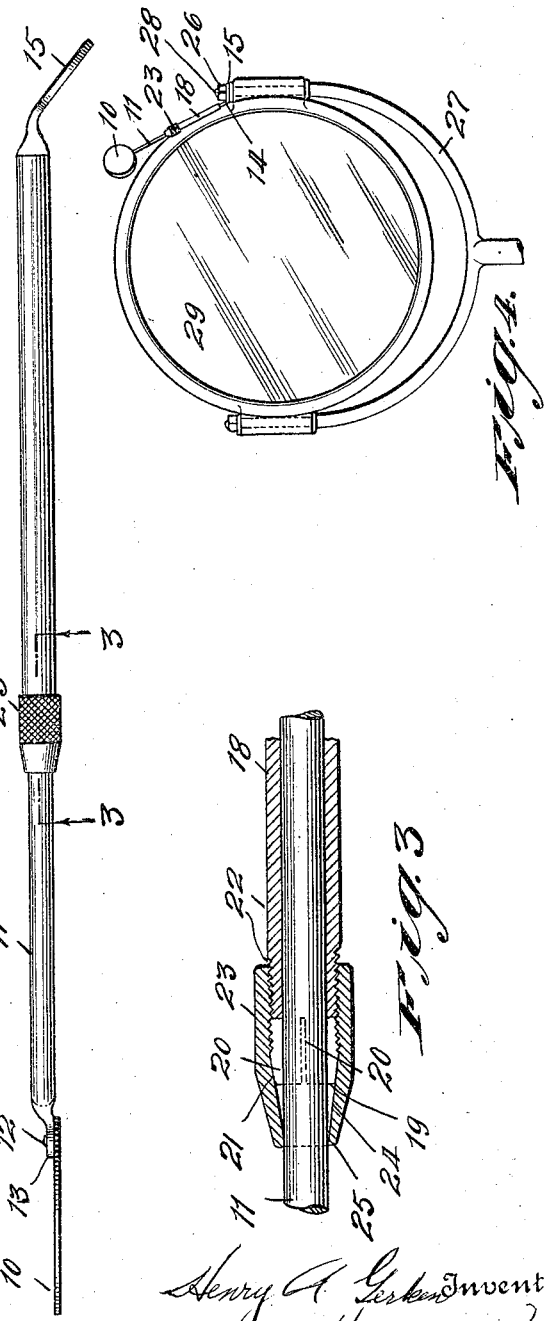

Patented Oct. 28, 1924.

1,513,546

UNITED STATES PATENT OFFICE.

HENRY A. GERKEN, OF NEW YORK, N. Y.

ILLUMINATION INDICATOR FOR LAMPS.

Application filed May 7, 1923. Serial No. 637,251.

*To all whom it may concern:*

Be it known that I, HENRY A. GERKEN, a citizen of the United States, residing in the city, county, and State of New York, have invented certain new and useful Improvements in Illumination Indicators for Lamps, of which the following is a specification.

This invention relates to illumination indicators for lamps and particularly to indicators suitable for use with the headlights of motor vehicles. The purpose of these indicators is to permit the driver or other occupant of the vehicle to observe from the tonneau that the headlights are properly lighted. The present invention is, as to certain features, an improvement over the device described in my previously filed application Serial No. 602,411, filed November 21, 1922.

The present invention is directed to a form of device which may be mounted adjacent the headlight and which has means for clamping the parts in various adjusted positions.

A convenient embodiment of the present invention is illustrated in the accompanying drawings, in which—

Figure 1 is an elevational view of the device;

Figure 2 is an elevational view taken at right angles to the view of Figure 1;

Figure 3 is a section taken on line 3—3 of Figure 2, looking in the direction of the arrows; and Figure 4 is a front elevation illustrating one manner of applying the device to a well-known type of automobile headlight.

Like characters of reference designate similar parts in each of the several views.

The device illustrated in the drawings has a mirror or reflector 10 made from a piece of non-rusting sheet metal such as, for example, aluminum or some suitable alloy. The mirror is fastened to a rod 11 by means of rivets 12 which pass through the mirror and the flattened and spread end 13 of the rod 11. This flattened end may be conveniently made by a forging operation. At the other end of the device there is provided a terminal member 14 having a flattened portion 15 provided with an aperture 16. This flattened portion is preferably placed at an angle to the shank 17 of the terminal member 14, for a purpose to be described.

The shank 17 of the terminal 14 is permanently fastened, as by soldering, to a tube 18 which is open at the opposite end 19, as shown in Figure 3. The end 19 of this tube is provided with a number of longitudinal saw-cuts or slits 20 with a conical outer surface 21, and with threads 22. A clamping nut 23 is provided which is of the proper size and proportion so that it fits the threads 23 and is brought against the conical surface 24 of the tube 18. The nut 23 is preferably shaped so that the end 25, remote from the threads, just fits around the rod 11.

In assembling the device on an automobile headlight such as the one shown in Figure 4, it is merely necessary to remove one of the nuts 26 from the headlight bracket 27 and pass the apertured member 14 down over the bolt 28 and replace the nut. On account of the angular relation of the flattened portion of the terminal member 14, the structure will be directed obliquely upward. It may be adjusted into the desired position either by swinging it about the bolt 28 or by turning the rod 11 inside tube 18 or sliding the rod in or out of the tube, as desired, it, of course, being understood that the nut 23 is loosened sufficiently to permit the latter operations to be carried out.

When the device has been located in the proper position, it is merely necessary to tighten the nut 26 and clamping nut 23 whereupon the reflector 10 may be located so that stray light from the headlight 29 will strike it and be reflected toward the driver.

In the preferred embodiment of the invention, the reflecting surface is given a somewhat dull appearance, so that the light reflected toward the driver is not such as to produce a glare or to interfere with the driver's vision of the road.

It will be noted that the device as described, has considerable range of adjustment so that identical devices may be used on varying sizes of headlights. Hence, it will not be necessary to provide different sized devices depending upon the size of headlight upon which they are to be used.

Although I have herein shown and described only one embodiment of the invention, it will be understood that many changes and modifications may be made therein within the scope of the following claims without departing from the spirit and scope of the invention, it being my intention to claim the same as broadly as the state of the prior art will permit.

What I claim is:

1. An indicator for automobile headlights, said indicator having a two-part shank, the lower end of one part of the shank having an obliquely-disposed foot by means of which the shank may be supported in front of a headlight, the opposite end of the other part having a reflector, the adjacent ends of the parts of the shank being in the form of two telescoping elements capable of relative rotary and sliding movement whereby the length of the shank and the angular position of the reflector may be varied.

2. In combination, an automobile headlight, a mounting for the headlight including a fastening member, and an illumination indicator mounted on said member, said indicator comprising a two-part shank, one part having an obliquely-disposed apertured foot for mounting the shank on the fastening member so as to support the indicator in front of the headlight, the opposite end of the other part having a reflector, the adjacent ends of the parts of the shank being in the form of two telescoping elements capable of relative rotary and sliding movement whereby the length of the shank and the angular position of the reflector may be varied.

In testimony whereof I have affixed my signature to this specification.

HENRY A. GERKEN.